United States Patent Office 3,265,660
Patented August 9, 1966

3,265,660
POLYOLEFIN COMPOSITIONS STABILIZED WITH THIODIORGANIC ESTERS AND HYDROXYSPI-ROHYDRINDENES
Robin Henry Burgess, Market Drayton, John Carswell McGowan, Harpenden, and Vivien Griffiths, Welwyn Garden City, England, assignors to Imperial Chemical Industries Limited, London, England, a corporation of Great Britain
No Drawing. Filed Dec. 29, 1960, Ser. No. 79,131
Claims priority, application Great Britain, Dec. 30, 1959, 44,282/59
19 Claims. (Cl. 260—45.85)

This invention relates to polymeric compositions and stabilisers therefor. It is well known that is is desirable to incorporate antioxidants into solid polymers and predominantly hydrocarbon copolymers of unsaturated hydrocarbons, e.g., polythene (the solid polymers of ethylene), polypropylene, polyisobutylene, polybutene -1, poly-3 - methyl - butene - 1, poly - 4 - methyl - pentene - 1, ethylene-propylene copolymers, and the polymers and copolymers of conjugated dienes, for instance butadiene and isoprene, e.g., natural rubber, polybutadienes, polyisoprenes, and copolymers of butadiene with minor amounts of styrene, acrylonitrile, or methyl methacrylate. These polymers, hereinafter and in the appended claims, will be referred to as solid olefine polymers as hereinbefore defined.

Solid isotactic aliphatic mono-α-olefine polymers, by which we means polymers not less than 75% of which are insoluble in heptane, particularly isotactic polypropylene, are materials with excellent mechanical and electrical properties which may be shaped for example into sheets, tubes, films, filaments and mouldings by the shaping processes of the plastics industry. Because of their generally high melting points, however, it is necessary to use particularly active stabilisers in order to protect these polymers against degradation at elevated temperatures in processing or in subsequent use.

It is an object of the present invention to provide improved stabiliser compositions and solid olefine polymer compositions particularly solid isotactic mono-α-olefin polymer compositions usefully stabilised therewith.

Most of the previous proposals have been for the use of amines, phenolic compounds or sulphur compounds as antioxidants.

In our copending British applications Nos. 25999/59, 27567/59 and 44391/59 we show that when certain types of phenolic condensate are used in combination with diesters, or N,N'di- or N,N,N',N' tetra hydrocarbon-substituted diamides of thiodialkanoic acids (conjointly referred to hereinafter as thiodialkanoic acid derivatives) the most remarkable synergistic stabilisation of solid olefine polymers is obtained.

In the work which led to the filing of the above mentioned applications many combinations were examined which exhibited no significant synergism. For example, in polythene compositions, bisphenol A, tetrachloro bisphenol A, ethylidene bisphenol, or chromans formed by the condensation of m- or p-cresol with acetone, and Dianin's compound (a condensate of phenol with mesityl oxide) show no appreciable synergism with dilauryl thiodipropionate when the compounds are used at concentrations of 0.1% by weight of the composition.

Similarly in polypropylene compositions there is no appreciable synergism between 2,4-didodecyl phenol and dilauryl thiodipropionate (both compounds at 0.5% by weight of the composition).

Turning now to compositions comprising combinations of different sulphur compounds with the same phenolic compound in polythene (the compounds being used at concentrations of 0.1% by weight of the composition), dilauryl sulphide, 2,6-diphenyl tetrahydrothiopyrone and ethyl β-benzoylethyl sulphide show no appreciable synergism with a condensate of three molecules of 3 methyl-6-tertiary butyl phenol with one molecule of crotonaldehyde.

If however, a combination of dilauryl thiodipropionate and the above crotonaldehyde condensate is tested (the compounds being used at concentrations of 0.1% by weight of the polythene composition or 0.5% by weight of the polypropylene composition) a most astonishing degree of synergism is displayed.

From these results it is plain that an improved stabilising action is not in general to be expected from combinations of phenolic compounds and sulphur compounds.

It has previously been proposed to use hydroxyspirohydrindenes as sole antioxidants for rubber.

According to the present invention we now provide a composition which is surprisingly effective for stabilising olefine polymers as hereinbefore defined and comprises a thiodialkanoic acid derivative as hereinbefore defined and a hydroxy spirohydrindene having the formula

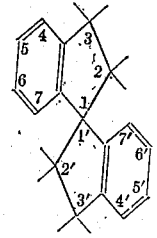

in which at least one of the substituents at positions 5 and 6 and at least one of the substituents at positions 5' and 6' is an hydroxyl group, the others being hydrocarbon alkoxyl or hydroxyl groups or hydrogen atoms, and in which there is adjacent to at least one of said hydroxyl groups in each benzene ring a hydrocarbon, alkoxyl or hydroxyl substituent and in which one substituent at each of positions 2 and 2' is a hydrogen atom, the other substituents R— and R'— respectively being hydrocarbon groups or hydrogen atoms, and the substituents at positions 3 and 3' are in each case primary hydrocarbon groups R"CH$_2$— and R"'CH$_2$—, and R" and R"' being hydrocarbon groups or hydrogen atoms, and in which the substituents may be the same or different.

It will be understood from the well-known mechanisms of the chemical reactions used in the preparation of our hydroxyspirohydrindenes that their hydroxyl groups will be in positions 5 or 6 and 5' or 6', normally in positions 5 and 5'.

In a modification of this invention hydrocarbon groups or chlorine or bromine atoms may be introduced into a hydroxyspirohydrindene of lower molecular weight—which may already have substituents—by for example the methods disclosed hereinafter.

We believe that in this case the substituents are introduced into positions adjacent to the phenolic hydroxyl group. This is borne out by the fact that the infrared spectrum of 2-tertiary butyl phenol/acetone condensate is almost indistinguishable from that of a condensate of phenol and acetone which has been butylated after its formation.

Whilst we find that usefully stabilised polyolefine compositions may be obtained with widely varying ratios of said thiodialkanoic acid derivative to said dihydroxyspirohydrindene and whilst our invention is in no way limited to particular ratios of these ingredients, we find that particularly effective ratios of these ingredients are when there are from 1 to 10 hydroxyl radicals provided to the composition by the dihydroxyspirohydrindene to each sulphur atom provided to the composition by the thiodialkanoic acid derivative. The content of these components in polyolefine compositions may also be varied over very wide limits. Thus, polyolefine compositions useful for a wide variety of applications, e.g., for making films, are effectively stabilised with, for example, 40 parts by weight per million of the dihydroxyspirohydrindene with an appropriate added amount of the thiodialkanoic acid derivative. For polyolefines which are more susceptible to oxidation than polythene or for polyolefine compositions which are to be subjected to vigorous conditions of oxidation during their processing or during their later use larger amounts of these additives would be used. In general with polythene it is sufficient to use from 0.001 to 0.5% by weight of the dihydroxyspirohydrindene and normally from 0.002 to 0.1% by weight of the dihydroxyspirohydrindene, the appropriate quantities of the thiodialkanoic acid derivative being used in conjunction with this product. For compositions of polyropylene, rubber or polymers or copolymers of conjugated dienes larger amounts of the components are usefully used. It is usually sufficient to use from 0.05% to 5% by weight of the dihydroxyspirohydrindene together with the thiodialkanoic acid derivative and, in general, from 0.2 to 1% is sufficient.

Any diester or N,N' di- or N,N,N',N'-tetra hydrocarbon substituted diamide of a thiodialkanoic acid may be used in the compositions of this invention. We find, however, that particularly satisfactory compositions are obtained when the derivatives are esters of aliphatic alcohols, especially those of alcohols of 10 to 20 carbon atoms, e.g., those of lauryl or stearyl alcohol, and of thiodiglycollic, thiodipropionic or thiodibutyric acids.

The hydrocarbon groups in the hydrocarbon-substituted diamides are preferably alkyl groups, particularly those corresponding to the preferred alcohols mentioned above. In general, for the same number of total carbon atoms in the alkyl groups, a disubstituted diamide is preferred to a tetra-substituted diamide of a given thiodialkanoic acid.

The dihydroxyspirohydrindene may for example be produced by condensing a phenol having a free meta and para position, with a ketone having at least 2 free hydrogen atoms on each of the carbon atoms directly attached to the carbonyl group under conditions in which three molecules of the ketone condense with two molecules of the phenol. Mixtures of phenols or mixtures of ketones may be used. If, as is convenient, a single ketone is used, then $R''=R$ and $R'''=R'$ in the foregoing formula. Suitable conditions are for example provided by carrying out the reaction in the presence of large quantities of a mixture of glacial acetic acid and concentrated hydrochloric acid as is described by Baker and Besley (J.C.S. (1939) p. 1421–4). Mono-substituted phenols having the substituent in the ortho position condense most readily. Acetone, methyl ethyl ketone and diethyl ketone also condense readily.

The reaction product is preferably purified before use, for example, by distillation in high vacuum or in the manner described by Baker and Besley. The crude dihydroxyspirohydrindene separated from the reaction medium may however also be used. Suitable phenols are, for example, ortho cresol, guaiacol, catechol, pyrogallol, 2,6-methyl phenol, 2-isopropyl phenol, 2-tertiary butyl phenol, 2-octyl phenol, 2-nonyl phenol, 2-decyl phenol, 2-methyl-6-isopropyl phenol, 2-methyl-3-tertiary butyl phenol, 2-methyl-6-tertiary butyl phenol, and 2-methyl-6-octyl phenol. Hydrocarbon substituents may be introduced into a hydroxyspirohydrindene having free reactive positions, e.g., a condensate of two molecules of phenol with three molecules of acetone, by reacting the hydroxyspirohydrindene with, e.g., butenes, pentenes, hexenes, heptenes, octenes, nonenes, decenes, undecenes, or dodecenes or the corresponding alcohols or halides which may be commercial technical grade mixtures or with styrenes or cyclohexenes in the presence of a catalyst. The hydroxyspirohydrindenes may also if desired be subjected to chlorination or bromination although this does not usually increase their activity. The stabilised compositions of this invention may be prepared in a variety of ways depending on the nature of the solid olefine polymer or the manner in which it is produced and also on the amount of stabilising material to be incorporated in the compositions. If only a small amount of antioxidant, e.g., 40 parts per million of each component is to be incorporated into polythene made by the high pressure process the stabilising components are suitably dissolved in a high boiling hydrocarbon liquid and this solution is mixed with the hot polythene in a suitable container after the polythene issues from the converter in which it is produced. Larger quantities of the stabilising components may be mixed with a solid olefine polymer by any of the mastication processes. A satisfactory method for mixing the stabilising ingredients with a solid olefine polymer made by the low pressure process is to add a solution of the components to the olefine polymer powder obtained by this process and then to remove the solvent for the stabilising components by evaporation.

The stabilising ingredients of this invention may be mixed with latices of natural rubber or the polymer or copolymers of conjugated dienes by forming dispersions of these in water, mixing these dispersions with the latices to be stabilised, and, if desired, coagulating or drying the latex compositions.

The compositions of this invention may also contain other stabilisers such as materials which absorb ultra violet light. They may also contain further ancillary ingredients such as processing aids, for example, the soaps of calcium and zinc and also such materials as pigments, dyes and fillers, and when necessary the other ingredients compounded with rubbers, e.g. vulcanising ingredients. Thus, carbon black may be incorporated either as an absorber of ultra violet light, as a filler or as a pigment.

The following experimental details illustrate our invention. It will be understood, however that our invention is in no way limited by these details.

PREPARATIONS (1) Guaiacol (200 g.), acetone (190 ml.), acetic acid (400 ml.) and concentrated hydrochloric acid (320 ml.) were heated under reflux on a steam bath for 110 hrs. The crystalline material was filtered off, after the mixture had cooled and stood for a few hours, and washed thoroughly with cold acetic acid and water and dried. The product (30 g.) was recrystallised from alcohol in a Soxhlet extractor.

M.P. 266–7° C.; after further recrystallisation (yield 23.9 g.) M.P. 268–9° C.

| Analysis | Found Percent | Required by $C_{23}H_{28}O_4$ |
|---|---|---|
| C | 74.7 | 75.0 |
| H | 7.9 | 7.7 |

(2) A mixture of o-cresol (100 g.), acetic acid (250 ml.), acetone (75 ml.) and concentrated hydrochloric acid (190 ml.) was heated under reflux on a steam bath for 60 hours, and then stirred into water. The very thick mass was collected, washed by kneading under water, dried by heating under diminished pressure on the water bath. The residue was then fractionated by vacuum distillation. The main fraction (B.P. 220–240°/0.3 mm.) was recrystallised from xylene to give small crystals, M.P. 245–7° C.

(3) 2.6 xylene-1-ol (110 g.), acetic acid (250 ml.), acetone (75 ml.) and concentrated hydrochloric acid were heated under reflux on a steam bath for 65 hours. The mixture was cooled, and water was added. The top layer was collected, washed successively with water, sodium carbonate solution, and water, and dried by distilling under vacuum on a water bath.

The gummy material was fractionated by vacuum distillation. The main fraction (B.P. 220–230° C./1.3 mm.) was yellow and became crystalline on standing. No suitable recrystallisation solvent could be found.

The brittle gum was acetylated with acetic anhydride and sodium acetate and the crude product was recrystallised from ethanol. M.P. 230–235° C.

The acetate was hydrolysed and the crystals obtained on acidification were dried and recrystallised from xylene. M.P. 194–195.5° C.

| Analysis | Found Percent | Required for $C_{25}H_{32}O_2$ |
|---|---|---|
| C | 82.0 | 82.4 |
| H | 8.9 | 8.9 |

| | | Required for $C_{29}H_{36}O_4$ |
|---|---|---|
| C [1] | 76.8 | 77.6 |
| H | 8.0 | 8.1 |

[1] Acetate.

| Equivalent | Found | Expected |
|---|---|---|
| Saponification of Acetate | 229 | 224.3 |

These are believed to be new compounds.

(4) Catechol and acetone were condensed by the method of Baker (J.C.S. (1934) p. 1678). Some of the product was brominated, as described by Baker, and a further portion was chlorinated by the following method:

A solution of the condensate (3 g.) in glacial acetic acid was saturated with chlorine. A bright red precipitate was formed. Sodium sulphite was added, and the mixture allowed to stand until the red colour had disappeared. The resulting light brown precipitate was filtered, recrystallised from dilute acetic acid, and dried in a vacuum desiccator. Analysis for chlorine (found —25%) indicated the presence of about 83% of the theoretical maximum substitution.

(5) Catechol (132 g.), methyl ethyl ketone (118.8 g.) glacial acetic acid (300 ml.) and concentrated hydrochloric acid (240 ml.) were heated on a steam bath for 48 hrs. A heavy crystalline mass formed. The reaction mixture was allowed to cool and the crystals were filtered off and recrystallised several times from glacial acetic acid. The still discoloured crystals were dissolved in the minimum amount of boiling ethanol, activated charcoal was added and the solution was filtered hot. An equal volume of boiling glacial acetic acid was added to the hot filtrate. The colourless crystals deposited on standing were filtered, dried under high vacuum over solid potassium hydroxide and finally in a drying pistol at 100° C. over solid potassium hydroxide and under high vacuum.

The product melted with decomposition at 302–5° C.

The acetate was prepared and recrystallised from ethanol, M.P. 169–173° C.

| Analysis of acetate | Found Percent | Required for $C_{32}H_{38}O_8$ |
|---|---|---|
| C | 79.3 | 69.8 |
| H | 7.1 | 7.0 |
| O | 22.4 | 23.2 |

This compound is described by Fabinyi and Szeky (Ber. 38, 2307).

(6) Pyrogallol and acetone were condensed by the method of Baker and Besley (J.C.S. (1939) p. 195).

(7) The condensation of phenol and acetone was described by Von Braun in 1929 (Liebigs Annalen 472, p. 65), but the product was not recognized at the time to be a spirohydrindene. This was shown by Curtis (Chem. and Ind. (1960) p. 928).

Octylated, styrenated, and methylcyclohexenated phenol/acetone condensates were prepared as follows:

(7a) The phenol-acetone spirohydrindene (5.1 g.) and concentrated sulphuric acid (0.5 g.) were placed in a flask and sufficient toluene added to dissolve the solid at 100° C. Octene (2,4,4-trimethyl pentene-1, 3.8 g.) in toluene (20 ml.) was added slowly and the mixture refluxed and stirred for 6 hours.

The reaction mixture was then cooled, washed with water, with sodium carbonate solution, and finally with water again. The toluene solution was dried over anhydrous sodium sulphate and the toluene removed by evaporation.

The residue was then distilled in vacuo.

A fraction of B.P. 210–220° C./0.1 mm. and the residue were tested as antioxidants.

(7b) The styrenated product was prepared as in (a), replacing the octene by styrene (3.5 g.) and using 30 ml. of toluene.

A fraction of B.P. 210–220° C./0.1 mm. and the residue were tested as antioxidants.

(7c) The spirohydrindene (10.3 g.), methylcyclohexene (11.1 g.) and a 50% solution of concentrated sulphuric acid and glacial acetic acid (6 ml.), were heated on the steam bath for 6 hours, the mixture cooled, toluene added and the product worked up as before.

The residue, after vacuum distillation to remove unchanged starting materials, was tested as an antioxidant.

(8) Diethyl ketone (86.2 g. 1.0 mole) catechol (55.1 g. 0.5 mole) glacial acetic acid (150 ml.) and concentrated hydrochloric acid (100 ml.) were heated on the steam bath for 5 days. On cooling, crystals were deposited in the flask and these were filtered, washed with cold acetic acid and recrystallised by dissolving in the minimum amount of ethanol, an equal volume of boiling acetic acid being added to the solution.

The white crystals were filtered, sucked dry and placed in a drying pistol under high vacuum at 150° C.

| Analysis | Found Percent | Required for $C_{27}H_{30}O_4$ |
|---|---|---|
| C | 76.6 | 76.4 |
| H | 8.6 | 8.6 |

The product melted above 300° C. with decomposition, beginning to char at 280° C.

This compound is described by Fabinyi and Szeky (Ber. 38, 2307).

(9) 2-tertiary butyl phenol (75 g.), acetone (40 ml.), glacial acetic acid (125 ml.), and concentrated hydrochloric acid (100 ml.) were heated on the steam bath for 60 hrs. The dark, viscous reaction mixture was washed with cold water and the thick oily organic layer separated by decantation, washed several times with hot water while stirring vigorously and finally dried by heating on the steam bath under reduced pressure. On cooling the gum became a brittle solid, which was fractionated by vacuum distillation.

The main fraction (B.P. 190–260° C./1.0 mm.) distilled as a thick heavy yellow liquid which became brittle on cooling.

Attempts to crystallise this solid directly were unsuccessful.

The acetate (B) was prepared in the usual manner, and recrystallised from ethanol. M.P. 235–237° C.

The recrystallised acetate was hydrolysed and the white crystals (A) were recrystallised from xylene. M.P. 135° C.

| Analysis | Found Percent | Required for $C_{29}H_{40}O_2$ |
|---|---|---|
| C | 82.6 | [1] 82.8 |
| H | 9.7 | 9.6 |
| | | Required for $C_{33}H_{44}O_4$ |
| C | 78.6 | [2] 78.5 |
| H | 8.8 | 8.8 |

[1] (A).
[2] (B).

The equivalent (by saponification of the acetate) was 240, the expected value corresponding to the above formula being 252.

These are believed to be new compounds. A compound showing substantially the same infra-red spectrum as (A) was obtained by butylation of the phenol/acetone spirohydrindene of preparation 7.

The infra-red spectra of preparations 1 to 9 indicated the presence of benzene rings substituted to a degree consistent with the spirohydrindene structure in each case.

at 140° C. The compositions were pressed at 150° C. into sheets 1/200 of an inch thick. Small samples of the 1/200 of an inch pressing were placed on glass wool in a glass bulb which contained Type 5A "Linde" (registered trademark) molecular sieves to absorb gaseous products of oxidation and which was connected by a U-tube containing mercury to another glass bulb. ("Linde" molecular sieves are synthetic zeolites produced and sold by Unior Carbide and Carbon Corporation.) Both bulbs were filled with air, then sealed and the apparatus placed in a vapour thermostat at 140° C. Movement of the mercury indicated oxidation of the polythene and the time in the vapour thermostat at 140° C. until a notable rate of movement of the mercury was apparent was measured. Smples of an inch long by 7/8 of an inch wide cut from the 1/200 of an inch thick sheet were placed on microscope slides in an air oven at 140° C. Samples were removed at intervals and the extent of oxidation was estimated by measuring carbonyl group concentration by infra-red spectroscopy using the absorption band at 5.85 microns wave length. The time before the oxygen present as carbonyl was greater than 0.1% was measured.

TABLE 1—POLYTHENE

| Expt. | Thiodialkanoic Acid Derivative | | Spirohydrindene | | Induction Period, Hours at 140° C. | |
|---|---|---|---|---|---|---|
| | Nature | Quantity, percent | Formed by condensation of— | Quantity, percent | Oxygen Uptake | Oven Ageing |
| 1 | None | 0 | None | 0 | 2½ | 2½ |
| 2 | Dilauryl thiodipropionate | 0.1 | do | 0 | 40 | 10 |
| 3 | None | 0 | Guaiacol/acetone | 0.1 | 30 | 18 |
| 4 | do | 0 | Phenol/acetone | 0.1 | 16 | >8 |
| 5 | do | 0 | 2-t-butyl phenol/acetone | 0.1 | 43 | 20 |
| 6 | do | 0 | Catechol/acetone | 0.1 | 250 | 115 |
| 7 | do | 0 | Catechol/methylethyl ketone | 0.1 | 210 | 190 |
| 8 | Dilauryl thiodipropionate | 0.1 | Phenol/acetone | 0.1 | 60 | 10 |
| 9 | do | 0.1 | o-Cresol/acetone | 0.1 | 190 | 45 |
| 10 | do | 0.1 | Guaiacol/acetone | 0.1 | 110, 200 | 35, 45 |
| 11 | do | 0.1 | 2.6 dimethylphenol/acetone | 0.1 | 300, 70 | 70, 25, 35 |
| 12 | do | 0.1 | 2-tertiary butyl phenol/acetone | 0.1 | 330 | [1] 240 |
| 13 | do | 0.1 | Catechol/acetone | 0.1 | 310 | 320 |
| 14 | do | 0.1 | Catechol/methylethyl ketone | 0.1 | 260 | 250 |
| 15 | do | 0.1 | Catechol/diethyl ketone | 0.1 | 350 | 230 |
| 16 | do | 0.1 | Pyrogallol/acetone | 0.1 | 1250 | 230 |
| 17 | do | 0.1 | Tetrabromo catechol/acetone | 0.1 | 330 | 90 |
| 18 | do | 0.1 | Catechol/acetone (Chlorinated) | 0.1 | | 140 |
| 19 | do | 0.1 | Phenol/acetone (Octylated) 220–240° C./0.1 mm | 0.1 | 230 | [1] 110 |
| 20 | do | 0.1 | Phenol/acetone (Octylated) (residue) | 0.1 | 120 | 90, 40 |
| 21 | do | 0.1 | Phenol/acetone (Styrenated) 210–220/0.1 mm | 0.1 | 250 | 60 |
| 22 | do | 0.1 | Phenol/acetone (Styrenated) (residue) | 0.1 | 230 | [1] 160, 110 |
| 23 | do | 0.1 | Phenol/acetone (Methyl cyclohexenated) | 0.1 | 430 | 270 |
| 24 | Dilauryl thiodipropionamide | 0.1 | Catechol/acetone | 0.1 | | 220 |
| 25 | Dilauryl thiodiglycollate | 0.1 | do | 0.1 | | 190 |
| 26 | Dilauryl thiodibutyrate | 0.1 | do | 0.1 | | 345 |
| 27 | Distearyl thiodipropionate | 0.1 | do | 0.1 | 530 | 370 |
| 28 | Dilauryl thiodipropionate | 0.1 | do | 0.5 | | 620 |
| 29 | do | 0.5 | do | 0.1 | | 780 |
| 30 | do | 0.5 | do | 0.5 | | 880 |
| 31 | do | 0.01 | do | 0.01 | 20 | 30 |

[1] (AV).

Example I

Polythene of melt flow index 2 (as measured by the A.S.T.M method) was mixed with various thiodialkanoic acid derivatives and various hydroxyspirohydrindenes including some derivatives of hydroxyspirohydrindenes formed by chlorination, bromination, or reaction with styrene, octene or methycyclohexene of a preformed hydroxyspirohydrindene, as set out in Table 1 below (the quantities shown being percent by weight of the polythene composition), by milling these ingredients together

Example II

Polypropylene of melt flow index 5 (as measured by the A.S.T.M method modified by using a 10 kg. weight instead of that specified for causing extrusion) was mixed on open rolls at 165° C. with various thiodialkanoic acid derivatives and various hydroxyspirohydrindenes, in quantities which are shown in percent by weight of the polypropylene composition in the following table.

Thin sheets about 1/50 of an inch thick were prepared by moulding at 190° C. from each of the compositions obtained. These sheets were held in an air oven at 140° C. until they were found to be brittle when handled. The results of these tests were as follows:

TABLE 2—POLYPROPYLENE

| Expt. | Thiodialkanoic Acid Derivative | | Spirohydrindene | | Embrittlement time at 140° C., hours |
|---|---|---|---|---|---|
| | Nature | Quantity | Formed by condensation of— | Quantity | |
| 1 | None | 0 | None | 0 | 5 |
| 2 | Dilauryl thiodipropionate | 1.0 | ----do---- | 0 | 50 |
| 3 | None | 0 | 2-tertiary butyl/phenol/acetone | 1.0 | 195 |
| 4 | ----do---- | 0 | o-Cresol/acetone | 1.0 | 35 |
| 5 | ----do---- | 0 | 2,6-dimethyl phenol/acetone | 1.0 | 25 |
| 6 | ----do---- | 0 | Guaiacol/acetone | 1.0 | 50 |
| 7 | ----do---- | 0 | Pyrogallol/acetone | 1.0 | 280 |
| 8 | Dilauryl thiodipropionate | 0.5 | o-Cresol/acetone | 0.5 | 625 |
| 9 | ----do---- | 0.5 | Guaiacol/acetone | 0.5 | 430 |
| 10 | ----do---- | 0.5 | Catechol/acetone | 0.5 | 600 |
| 11 | ----do---- | 0.5 | 2,6-dimethyl phenol/acetone | 0.5 | 650 |
| 12 | ----do---- | 0.5 | Pyrogallol/acetone | 0.5 | 625 |
| 13 | ----do---- | 0.5 | Catechol/acetone (Chlorinated) | 0.5 | 435 |
| 14 | ----do---- | 0.5 | Catechol/acetone (Brominated) | 0.5 | 215 |
| 15 | ----do---- | 0.5 | Catechol/methyl ethyl ketone | 0.5 | 650 |
| 16 | ----do---- | 0.5 | Catechol/diethyl ketone | 0.5 | 910 |
| 17 | ----do---- | 0.5 | 2-t-butyl phenol/acetone | 0.5 | 550 |
| 18 | ----do---- | 0.5 | Phenol/acetone (Styrenated) | 0.5 | [1] 605/510 |
| 19 | ----do---- | 0.5 | Phenol/acetone (Methylcyclohexenated) | 0.5 | 600 |
| 20 | ----do---- | 0.5 | Phenol/acetone (Octylated) | 0.5 | 555 |
| 21 | Dilauryl thiodibutyrate | 0.5 | 2,6-dimethyl phenol/acetone | 0.5 | 145 |
| 22 | Distearyl thiodipropionate | 0.5 | Catechol/acetone | 0.5 | 1650 |
| 23 | Dilauryl thiodipropionamide | 0.5 | Catechol/methyl ethyl ketone | 0.5 | 385 |
| 24 | Dilauryl thiodiglycollate | 0.5 | Catechol/diethyl ketone | 0.5 | 720 |
| 25 | Dilauryl thiodipropionate | 0.1 | o-Cresol/acetone | 0.1 | 100 |
| 26 | ----do---- | 0.25 | ----do---- | 0.25 | 240 |
| 27 | ----do---- | 0.25 | ----do---- | 0.5 | 460 |
| 28 | ----do---- | 0.5 | ----do---- | 0.25 | 645 |
| 29 | ----do---- | 0.5 | ----do---- | 0.5 | 625 |
| 30 | ----do---- | 1.0 | ----do---- | 1.0 | 815 |

[1] = Residue.

*Example III*

Antioxidants were incorporated into nitrile rubber by milling for a few minutes on cold rolls. The oxidation resistance of the resulting crepes was measured by oxygen uptake as described for polythene except that the test was conducted at 78° C. instead of 140° C.

Results:

Antioxidant system— Induction period— hours at 78° C.
None — 10
1% dilauryl thiodipropionate LTPA — 50
1% o-Cresol/acetone — ca. 60
1% LTPA+1% o-Cresol/acetone — 400

*Example IV*

Antioxidants were incorporated into polybutene-1 by mastication at 150–160° C. under nitrogen using the mixing chamber of a Baker Perkins Vertical Masticator, for 10 minutes. The sample was pressed to a thickness of 5 thousandths of an inch at 179° C. and the oxidation resistance measured by oxygen uptake at 140° C. as described for polythene.

Antioxidant system: Induction period— hours at 140° C.
None — <<4
0.5% LTPA, 0.5% catechol/acetone — >1000

No appreciable staining was observed on milling the polythene or polypropylene compositions containing the guaiacol/acetone condensate or condensates of purely hydrocarbon-substituted phenols, or on exposure of samples 1/60 of an inch thick and 1½ inches long by ½ inch wide prepared from these compositions for 24 hours 10 cms. from a 500-watt high pressure mercury arc Hanovia S500 source of ultra-violet light, screened by ½ mm. Pyrex cutting out light of less than 2850 A.

Some staining was observed on milling polypropylene with the catechol and pyrogallol condensates, but this did not become more pronounced on exposure to ultraviolet light and the slightly discoloured compositions were bleached by this treatment. In polythene where the quantity of the cathechol and pyrogallol condensates used was less than was used with polypropylene, the staining was inappreciable.

In the antioxidant combinations of our abovementioned copending British patent applications, for the best results the phenol or aldehyde or ketone, condensed to form the phenolic compound preferably both, should have a large substituent, e.g., a large hydrocarbon substituent.

It is, therefore, in the highest degree surprising that we now find as will be seen from Examples I to IV that although the phenol must have a substituent, the smaller substituents, e.g., methyl, methoxy, hydroxy are of the same order of effectiveness as the larger substituents, e.g., octyl or nonyl groups in both polythene and polypropylene.

We prefer that the substituents in the phenolic nuclei do not together provide more than twelve additional atoms of atomic weight twelve or greater to each phenolic nucleus as the hydroxyspirohydrindenes of high molecular weight, in general, are not more useful but merely more expensive.

As will be seen from the foregoing example, two sets of experiments have been carried out with polythene.

In the first set, the stabilised compositions are aged in an enclosed vessel and the oxygen uptake at 140° C. measured volumetrically; under these conditions the volatility of the stabliser components has little effect on the measurements, and the test is an indication of the behaviour in service of the stabilised compositions under the conditions such that loss of stabiliser by volatilisation is unimportant.

In this test we find that there is little to choose between the condensates having small substituents, e.g., 2,6-dimethyl phenol, guaiacol and catechol, and those having large substituents, e.g., the octylated, styrenated and t-butylated condensates.

In the second set, the stabilised compositions are aged in an oven at 140° C. the increase in carbonyl oxygen being followed by measuring the infra-red absorption at 5.85 microns in samples removed at intervals. This test takes into account the volatility of the stabiliser components and is a measure of the behaviour of the compositions in processing or subsequent use when the stabiliser may volatilise, e.g., at high temperatures.

In this test, the condensates having large hydrocarbon substituents and the catechol and pyrogallol condensates are for the most part roughly equivalent; especially good results are obtained with the catechol/acetone condensate, the condensates of o-cresol, guaiacol, and 2,6-dimethyl phenol being less satisfactory.

In the polypropylene embrittlement test in which the polypropylene samples are held in an air oven at 140° C. until they are found to be brittle, the catechol/diethyl ketone condensate is outstanding. The other condensates tested show no very significant differences, except for the guaiacol/acetone condensate which is slightly less active.

Chlorination or bromination of the condensates generally does not improve or even reduces their activity in the above tests. On the basis of these results, on the grounds of their great activity, we prefer the pyrogallol condensates for stabilising polythene which is not to be exposed to extremes of temperature in subsequent use and in cases in which the somewhat greater level of staining caused by these condensates is not a disadvantage, e.g., in dark coloured, for instance carbon-black filled compositions.

For use in lighter coloured compositions any of the other condensates shown may be used, whilst if it is particularly important to avoid staining the hydrocarbon-substituted condensates are preferred.

The choice in this case will be principally determined by the cost and availability of starting materials and the ease of carrying out the condensation; condensates of o-cresol are particularly preferred for reasons of economy.

For stabilising polythene which is to be exposed to high temperatures in subsequent use we prefer the catechol, pyrogallol and t-butyl phenol condensates, and the methyl-cyclohexenated phenol condensates. The remarks as to staining apply here also.

For stabilising polypropylene we prefer the catechol/diethyl ketone condensate for its effectiveness, and condensates of o-cresol for reasons of economy.

We claim:

1. A composition comprising (1) an ester of a di-alkanoic acid selected from the class consisting of diesters thiodiglycollic thiodipropionic and thiodibutyric acids with an aliphatic alcohol containing from ten to twenty carbon atoms, and (2) a hydroxyspirohydrindene having the formula:

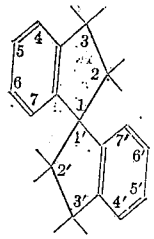

in which at least one substituent at positions 5 and 6 and at least one of the substituents at positions 5' and 6' is a hydroxyl group, the others being selected from the class consisting of hydrocarbon, alkoxyl and hydroxyl groups and hydrogen atoms, and in which there is adjacent to at least one of said hydroxyl groups in each benzene ring a substituent selected from the class consisting of hydrocarbon, alkoxyl and hydroxyl groups and in which one substituent at each of positions 2 and 2' is a hydrogen atom, the other substituents R— and R'— respectively being selected from the class consisting of hydrocarbon groups and hydrogen atoms, and the substituents at positions 3 and 3' are in each case primary hydrocarbon groups R''CH$_2$— and R'''CH$_2$—, R'' and R''' being selected from the class consisting of hydrocarbon groups and hydrogen atoms, there being from one to ten hydroxyl atoms provided to the composition by the hydroxyspirohydrindene to each sulfur atom provided to the composition by the thiodialkanoic acid ester.

2. A composition according to claim 1 in which the diester is selected from the class consisting of dilauryl and distearyl thiodipropionates and thiodibutyrates.

3. A composition according to claim 1 in which the hydroxyspirohydrindene is the product of condensation of two molecules of a phenol having a free meta and para position with three molecules of a ketone having at least 2 free hydrogen atoms on each of the carbon atoms directly attached to the carboxyl groups.

4. A composition according to claim 3 in which the ketone is an aliphatic ketone.

5. A composition according to claim 4 in which the ketone has from three to six carbon atoms.

6. A composition according to claim 5 in which the ketone is selected from the class consisting of acetone, methyl ethyl ketone, and diethyl ketone.

7. A composition according to claim 3 in which the substituents of the phenol are selected from the class consisting of hydrocarbon radicals and hydrogen atoms.

8. A composition according to claim 3 in which the phenol is selected from the class consisting of catechol and pyrogallol.

9. A composition according to claim 7 in which the phenol is 2,6-dimethyl phenol.

10. A composition according to claim 7 in which the phenol is o-cresol.

11. A composition according to claim 1 in which a hydroxyspirohydrindene is used into which hydrocarbon groups have been introduced after its formation.

12. A composition according to claim 1 in which there are from 1 to 10 hydroxyl radicals provided to the composition by the hydroxyspirohydrindene to each sulfur atom provided to the composition by the thiodialkanoic acid derivative.

13. A polymeric composition comprising a composition according to claim 1 and a solid polymer selected from the class consisting of solid homopolymers and copolymers of aliphatic mono-α-olefines, solid homopolymers of butadiene and copolymers of butadiene with minor amounts of a monomer taken from the class consisting of styrene, acrylonitrile and methyl methylacrylate.

14. A polymeric composition according to claim 13 in which the solid polymer is a solid polymer of ethylene and the weight of hydroxyspirohydrindene is from 0.001 to 0.5% by weight of the composition.

15. A polymeric composition according to claim 14 in which the weight of hydroxyspirohydrindene is from 0.002 to 0.1% by weight of the composition.

16. A polymeric composition according to claim 13 in which the solid polymer is a solid polymer of an olefine having at least three carbon atoms and the weight of hydroxyspirohydrindene is from 0.05 to 5% by weight of the composition.

17. A polymeric composition according to claim 16 in which the weight of hydroxyspirohydrindene is from 0.2 to 1% by weight of the composition.

18. A polymeric composition according to claim 16 in which the solid olefine polymer is an isotactic mono-α-olefine polymer.

19. A polymeric composition according to claim 18 in which the solid olefine polymer is isotactic polypropylene.

References Cited by the Examiner

UNITED STATES PATENTS

| | | | |
|---|---|---|---|
| 2,176,881 | 10/1939 | Burroughs | 260—619 |
| 2,176,882 | 10/1939 | Fisher | 260—619 |
| 2,956,982 | 10/1960 | McCall et al. | 260—45.85 |
| 2,981,717 | 4/1961 | Boultbee | 260—45.85 |

OTHER REFERENCES

Baker: J.C.S. (London) 1934, 1678.

LEON J. BERCOVITZ, *Primary Examiner.*

MILTON STERMAN, *Examiner.*

H. E. TAYLOR, *Assistant Examiner.*